United States Patent [19]

Lieber

[11] 4,120,002

[45] Oct. 10, 1978

[54] STREAK CAMERA TUBE

[75] Inventor: Albert J. Lieber, Los Alamos, N. Mex.

[73] Assignee: General Engineering & Applied Research, Inc., Palo Alto, Calif.

[21] Appl. No.: 755,226

[22] Filed: Dec. 29, 1976

Related U.S. Application Data

[63] Continuation of Ser. No. 608,379, Aug. 27, 1975, abandoned.

[51] Int. Cl.[2] .............................................. H04N 5/32

[52] U.S. Cl. .................................... 358/111; 358/209

[58] Field of Search ............................... 358/111, 209; 250/213 VT; 313/383, 95, 99; 315/10, 11

[56] References Cited

U.S. PATENT DOCUMENTS

| | | | |
|---|---|---|---|
| 3,603,828 | 9/1971 | Sheldon | 250/213 TV |
| 3,761,614 | 9/1973 | Bradley | 358/226 |
| 3,777,201 | 12/1973 | Einstein | 250/213 TV |

*Primary Examiner*—Richard Murray
*Attorney, Agent, or Firm*—Flehr, Hohbach, Test, Albritton & Herbert

[57] ABSTRACT

A streak camera electron-optical image tube having a passive microchannel plate collimation adjacent the photocathode whereby photoelectrons are accelerated by the field between the photocathode and microchannel plate, and collimated by the microchannels. Collimated electrons pass a pair of deflection plates and strike a phosphor screen. Accelerating voltage and deflection voltage are synchronized with phenomenon photographed.

18 Claims, 6 Drawing Figures

STREAK CAMERA TUBE

This is a continuation of application Ser. No. 608,379 filed Aug. 27, 1975 and now abandoned.

BACKGROUND OF THE INVENTION

The present invention relates to electron optical image tubes for use in providing direct measurement of luminous events having durations as short as one picosecond or less and with a time resolution in the picosecond range. More particularly the present invention is concerned with image tube streak cameras capable of providing direct linear measurements of ultra short radiant energy pulses, for example from a source such a laser beam, or a luminous or x-ray discharge from a plasma.

DESCRIPTION OF THE PRIOR ART

Image tubes for streak cameras heretofore known in the art have been required to compromise between resolution and speed of operation. High resolution tubes have employed a photocathode, upon which the target is imaged, and an anode phosphor screen placed fairly distant from the photocathode. Due to spherical sector electron pinhole optics, the space charge at the pinhole causes severe resolution loss. Such tubes, therefore, must be operated at low gain, requiring image intensifiers attached to the anode to provide the necessary gain. An extractor electrode placed adjacent the photocathode is employed to accelerate electrons rapidly to decrease velocity dispersion. The extractor electrode comprises a mesh at high voltage adapted to increase the velocity of the photoelectrons after they are emitted from the photocathode. However the extraction electrode tends to degrade the resolution of the tube by adding a lens effect between adjacent meshes, and decreases sensitivity by interrupting photoelectrons.

SUMMARY OF THE INVENTION

It is the object of the present invention to provide an electron optical image tube for use in an image tube streak camera which is capable of providing direct measurement of picosecond pulses of radiant energy, with a time resolution in the picosecond range.

This is achieved in accordance with the present invention by an electron optical image tube comprising a photocathode and a passive microchannel plate collimator arranged to convert an image of the target incident thereon to a collimated electron beam, with deflection electrodes arranged to receive the collimated photoelectrons and subject them to an electric field to produce a streak record. Employment of the microchannel plate enables transverse photoelectron velocity selection, and allows focusing by virtue of the proximity of the phosphor to the photocathode. The short distance decreases the effect of longitudinal photoelectron velocity dispersion, increasing time resolution and maintaining sensitivity. In addition optical alignment of the image tube with the target is simplified considerably since a knife-edge defining the portion of the image of the target of interest is not required in the optical path. The knife-edge is replaced by a narrow active area on the photocathode or a narrow collimator. As a result the electron beam which is deflected across the anode screen images only the wanted portion of the target.

The invention will be more fully understood by the following description of certain preferred embodiments which are given by way of example and with reference to the accompanying drawings.

DESCRIPTION OF THE PREFERRED EMBODIMENTS

Figure 1:
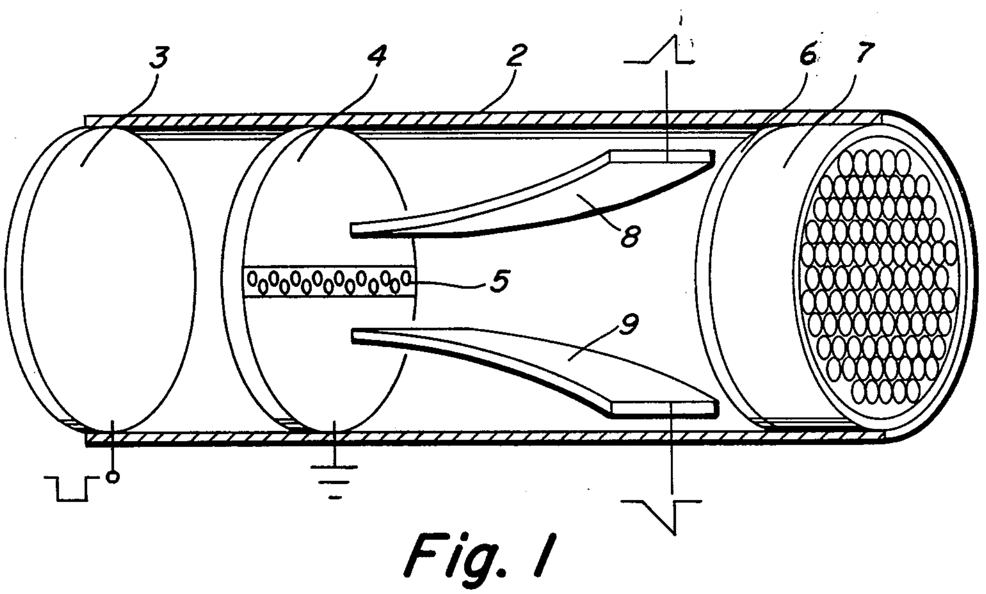
FIG. 1 illustrates the streak image tube embodying the present invention.

Referring now to the drawings and particularly to FIG. 1 thereof, there is shown a streak tube 2 having a photocathode 3 upon which white pulses are focused. The photocathode 3 emits electrons in direct response to the incident light, the electrons being emitted from the photocathode 3 with velocities of differing magnitude and direction.

Figure 3:
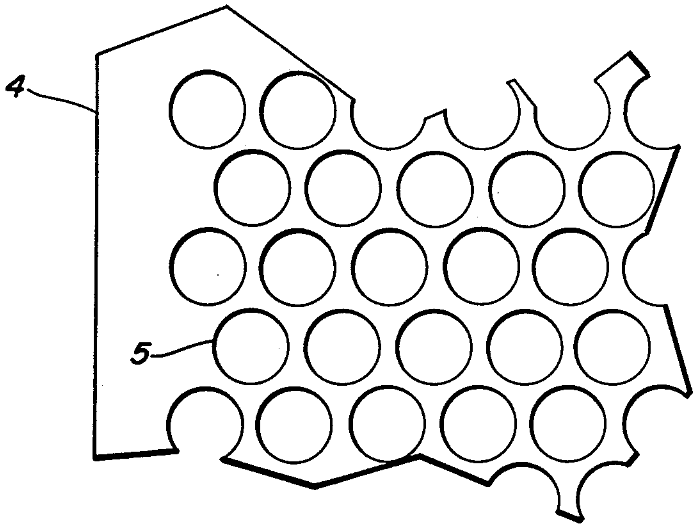
FIG. 3 illustrates the microtube collimator employed in the present invention.
Figure 4:
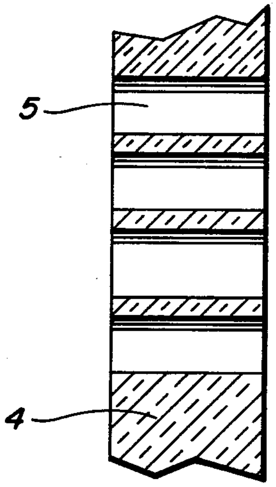
FIG. 4 is a cross section of the collimator of FIG. 3.

In accordance with the invention, a microchannel plate collimator 4 is provided, spaced from and adjacent to the photocathode 3. Microchannel plate collimator 4 is more clearly illustrated in FIGS. 3 and 4. Microchannel plates 4 are fabricated of lead glass, making them efficient absorbers of charged particles such as electrons. They are fabricated of a plurality of soft glass tubes 5, clad with harder glass. The tubes are arranged in a hexagonal array, and etched through. Bore diameters are of the order of 8 microns on 12 micron centers. The hollow tube arrays may be on the order of 0.55 millimeters to 1 centimeter long. Arrays of square tubules are also available of similar dimensions. The interior surfaces of the tubules are then plated with a suitable conductive layer (not shown) which does not emit secondary electrons. The conductive plating, however, need not extend all the way through the bores of the tubes. The conductive layer minimizes surface charge buildup and the resultant effective closing of the holes to electrons. Since the time resolution of the tube depends upon field intensity at the emitting surface of the photocathode 3, the gap between the photocathode 3 and the facing surface of microchannel plate 4 is momentarily pulsed to a voltage that would break down the gap if sustained. The plane surface of photocathode 3 and microchannel plate 4 allow a higher field to be applied than grid structues structures the prior art, thereby resulting in greater resolution.

The electrons accelerated by the field between photocathode 3 and microchannel plate 4 pass through the tubes in the collimating microchannel plate 4 only if they are traveling substantially normal to the face of microchannel plate 4. Electrons passed through the tubes in the plate are traveling in parallel lines, and at substantially the same velocity.

Since the phosphor screen 6 and microchannel collimator plate 4 are at the same potential, the electrons are subject only to the field of deflection plates 8 and 9.

As illustrated in FIG. 1 electrons emitted by photocathode 3 are first accelerated by an intense electric field between the photocathode 3 and microchannel plate 4. Screen 6 is coated with a suitable phosphor to make the electron beam visible. The image on the screen is conveyed to a suitable camera or, if required, to an image intensifier, (not shown), by a fiber optic plate 7. The collimated electron beam is deflected by a ramp voltage applied to deflection plates 8 and 9 in synchronism with the voltage pulse between photocathode 3 and plate 4.

Figure 5:
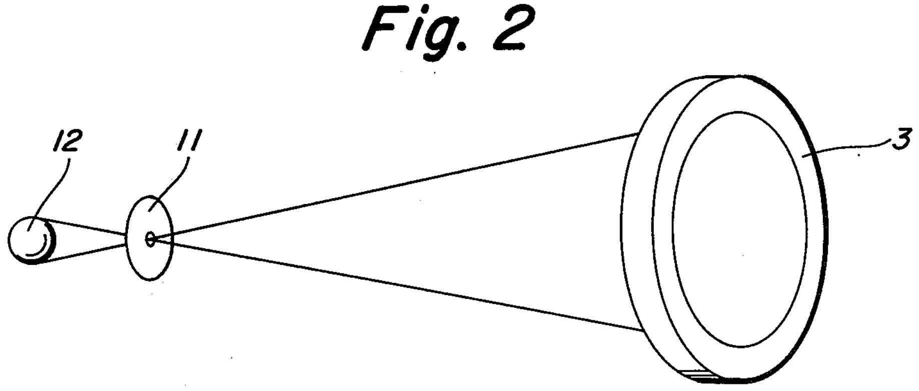
FIG. 5 illustrates the imaging of the target of the photocathode forming part of the image tube of the present invention; and, FIG. 6 illustrates an x-ray version of the streak image tube of the present invention.

As illustrated in FIG. 5 photocathode 3 has imaged thereupon by means of a pinhole aperture 11, the target 12. Since tubule collimator 4 as illustrated in FIG. 1, is furnished with an array of tubules only 100 microns wide, only a thin slice of the image of target 12 is presented to the anode 6. Heretofore, it has been necessary to place a knife edge slit in the optical path between pinhole 11 and photocathode 3.

Figure 2:
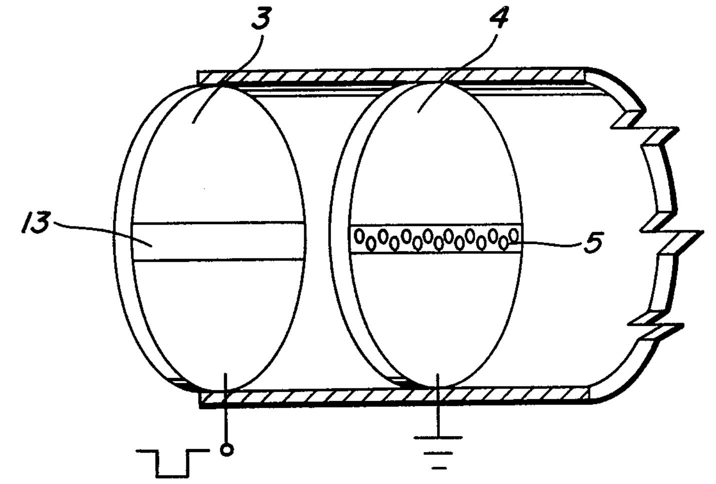
FIG. 2 is a modification of the image tube of FIG. 1.

In the embodiment of the invention illustrated in FIG. 2 the active photocathode material is in the form of a narrow strip 13. Photocathode strip 13 enables the use of a wider collimator array of tubules 5. In this manner the narrow strip of active photocathode material 13 serves the same function as the previously recorded knife edge or the narrow collimator array illustrated in FIG. 1. The arrangement illustrated in FIG. 2 can also be employed in connection with the streak photography of an x-ray source.

Figure 6:
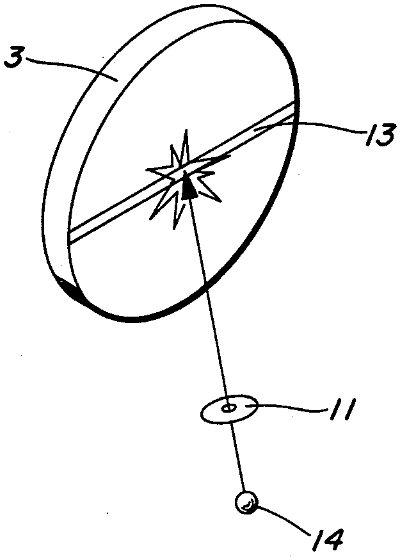

Referring to FIG. 6, x-ray source 14 is imaged by pinhole 11 as in the opitcal case FIG. 5. The x-ray image impinges upon suitable x-ray sensitive photocathode 13. Such a photocathode is frequently fabricated of gold. Conveniently the x-ray source is imaged through the side of the tube rather than the backside of the photocathode as in the optical case, providing greater spectral sensitivity. As will be apparent, a suitable x-ray transparent window is provided in the side of the tube 2.

What I claim is:

1. A streak camera image tube comprising a photocathode for receiving short duration photon images and converting them to photoelectrons, a passive collimator immediately adjacent the emission side of said photocathode, a phosphor screen for receiving said photoelectrons, and deflections electrode means adjacent the path of said photoelectrons between said passive collimator and said phosphor screen for deflecting said photoelectrons from their direction of movement across the phosphor screen.

2. In the image tube set forth in claim 1, said passive collimator comprising an array of hollow tubes adapted to pass only electrons emitted substantially normal to the surface of said cathode.

3. In the image tube set forth in claim 2, said passive collimator comprising a glass microchannel plate coated with an electrical conductor.

4. In the image tube set forth in claim 2, said passive collimator tube array having a width sufficiently narrow to function as a knife-edge optical slit.

5. In the image tube set forth in claim 1, said photocathode being responsive to visible light.

6. In the image tube set forth in claim 1, said photocathode being responsive to x-rays.

7. In the image tube set forth in claim 1, means for applying a voltage pulse between said photocathode and said passive collimator for accelerating electrons emitted by said photocathode.

8. In the image tube set forth in claim 7, means for applying a ramp voltage to said deflection electrodes.

9. In the image tube set forth in claim 1, wherein the photocathode is in the form of a narrow photocathode strip adapted to serve as a knife edge optical slit.

10. In an image tube for a streak camera, first and second elements having spaced apart parallel surfaces generally facing each other, the first element serving as a photocathode for converting photon images to photoelectrons, the second element serving as an extraction electrode for extracting photoelectrons from said photocathode and permitting extracted photoelectrons to pass therethrough, a phosphor screen for receiving said photoelectrons passing through said second element and moving in paths to said screen and a pair of spaced deflection plates disposed on opposite sides of said paths for deflecting said photoelectrons to cause the photoelectrons to move across the phosphor screen, said pair of deflection plates serving as the sole means for deflecting the photoelectrons in their travel from the second element to the phosphor screen.

11. A tube as in claim 10 wherein said second element serves as collimating means for collimating the paths of travel of the photoelectrons.

12. A tube as in claim 10 together with means for applying high voltage between the first and second elements to establish a high intensity field between the first and second elements.

13. A tube as in claim 12 wherein said second element serves to prevent the field from spreading into the space between the second element and the screen.

14. A tube as in claim 13 wherein said collimating means provides parallel holes extending through the second element.

15. A tube as in claim 14 wherein said holes are arranged along a narrow band.

16. A tube as in claim 10 wherein said photocathode is formed of a material which emits photoelectrons upon being struck by visible light.

17. A tube as in claim 10 wherein said photocathode is formed of a material which emits photoelectrons upon being struck by x-rays.

18. In a method for forming images on a phosphor screen from photoelectrons produced from a photocathode, creating a strong electric field adjacent to the photocathode for extracting photoelectrons from the cathode, collimating the paths of travel of the photoelectrons from the photocathode to the screen by the use of a collimator and deflecting the photoelectrons after they have been collimated by the use of a single pair of deflecting electrodes positioned exclusively between the collimating means and the screen so that photoelectrons move across the phosphor screen.

* * * * *